United States Patent

Lyons et al.

[15] 3,641,753

[45] Feb. 15, 1972

[54] HARVESTER FOR ASPARAGUS AND LIKE CROPS

[72] Inventors: Charles R. Lyons; Adam D. Dunn, both of Route 2, Box 119B, Zillah, Wash. 98953; Leslie Wadekamper, 17 Lo. Ahtanum Road, Yakima, Wash. 98903

[22] Filed: Feb. 16, 1970

[21] Appl. No.: 11,608

[52] U.S. Cl. .........................................................56/327 A
[51] Int. Cl. ............................................................A01d 45/00
[58] Field of Search ..................56/327; 171/54, 56, 64, 53

[56] References Cited

UNITED STATES PATENTS

| | | | |
|---|---|---|---|
| 3,426,516 | 2/1969 | Lyons | 56/327 A |
| 2,940,529 | 6/1960 | Kroll | 171/56 X |
| 3,066,469 | 12/1962 | Chatagnier | 56/327 A |
| 2,791,878 | 5/1957 | Kepner | 56/327 A |
| 3,529,714 | 9/1970 | Mayhew et al. | 56/327 A X |

Primary Examiner—Louis G. Mancene
Assistant Examiner—D. L. Weinhold
Attorney—Wells, St. John & Roberts

[57] ABSTRACT

An asparagus harvester is provided with a continuous conveyor having flexible transverse paddles mounted thereon with free ends for moving downward between the asparagus as the harvester is propelled. A belt deflector engages the free ends of the paddles deflecting one paddle against the succeeding paddle to grip the asparagus therebetween. The paddles are then elevated while they are biased together to remove the severed spears while permitting the unsevered spears to remain in the ground.

4 Claims, 3 Drawing Figures

PATENTED FEB 15 1972

INVENTORS
Charles R. Lyons
Adam D. Dunn
BY Leslie Wadekamper

Wells, St. John & Roberts
Attys.

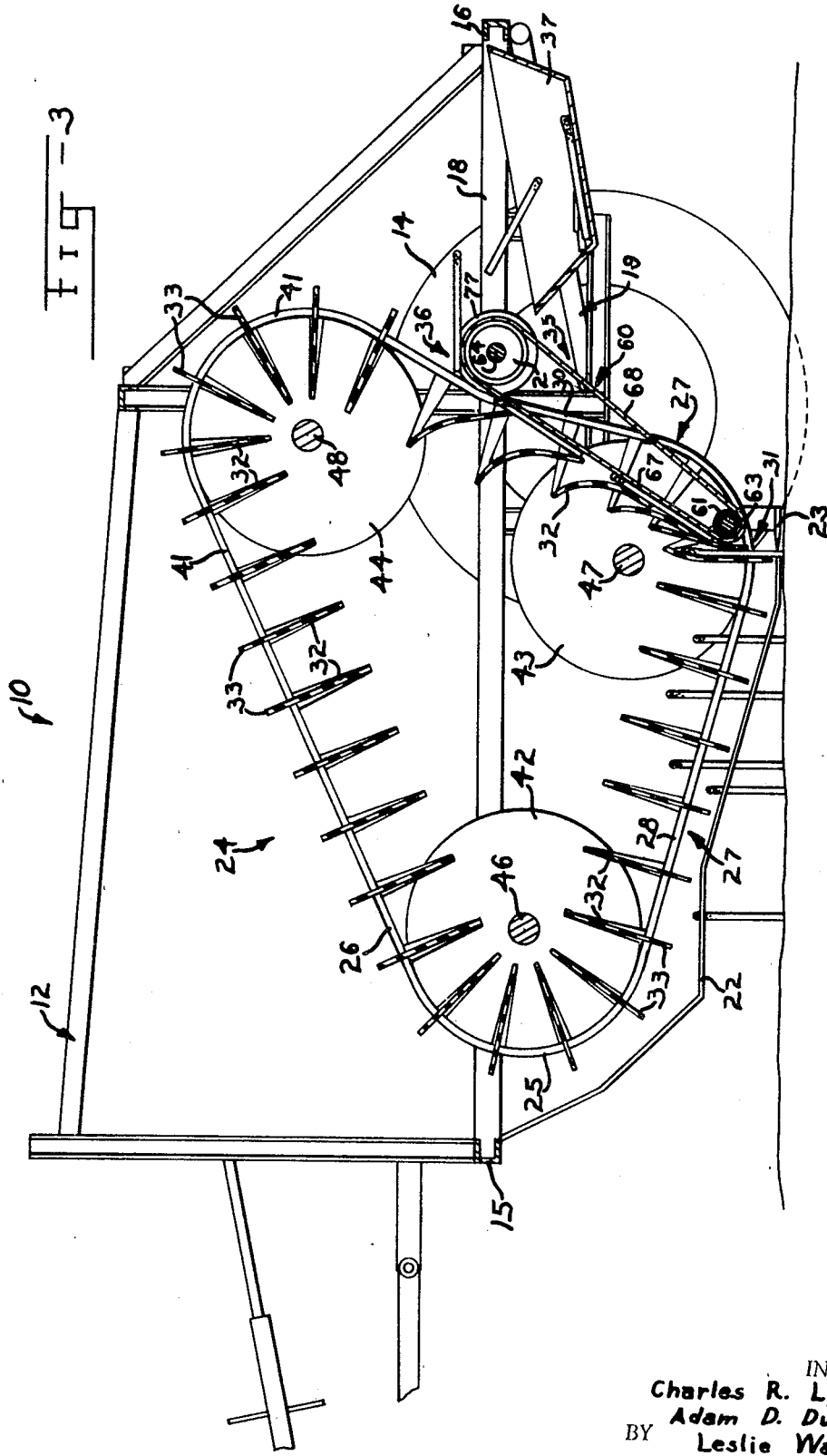

HARVESTER FOR ASPARAGUS AND LIKE CROPS

BACKGROUND OF THE INVENTION

This invention relates to asparagus harvesters and more particularly to arrangements on such harvesters for picking up and handling severed asparagus spears.

Although many prior attempts have been made to develop commercially acceptable asparagus harvesters, it is fair to say that there is still none available that is commercially acceptable. At the present time almost all of the asparagus is still harvested by hand. Examples of such prior attempts are disclosed in U.S. Letter Pat. Nos. 2,791,878; 3,066,469; 3,176,456; 3,410,067; 3,412,541; and 3,426,516. Some of the units disclosed in the patents have been constructed and tested, but have been found deficient for one reason or another.

One of the basic problems associated with the development of an asparagus harvester, is the inability of mechanically cutting the mature spears and mechanically removing the severed spears from the field without either damaging the severed spears or the immature spears that are left.

This invention is directed principally to devising a mechanical arrangement that is capable of gripping severed spears and removing the severed spears from the field.

A further object of this invention is to provide a pickup feature for an asparagus harvester that efficiently picks up and conveys the severed spears with a minimum of loss and contamination.

An additional object is to provide a spear pickup feature in which the severed spear does not touch the ground and wherein the feature provides very little air-soil turbulence.

A further object of this invention is to provide an inexpensive and reliable apparatus for gripping and carrying away the mature spears once they are severed without damaging the unsevered spears.

BRIEF OUTLINE OF THE INVENTION

These and other objects and advantages are accomplished by mounting an endless conveyor on the mobile frame that moves at the same rate as the harvester with a lower flight having a front segment that extends downward toward the spear-cutting element and a rear segment that extends upward from the cutting elements to a discharge station. A plurality of flexible paddles are mounted on the conveyor with free ends extending downward along the lower flight. A deflecting means engages the free ends of the paddles as they move along the rear segment of the lower flight to press the free ends against each other to grip the severed spears and carry the severed spears upward without damaging the unsevered spears.

BRIEF DESCRIPTION OF THE DRAWINGS

A preferred embodiment of this invention is illustrated in the accompanying drawings, in which:

FIG. 3 is a longitudinal vertical cross-sectional view showing the operation of the harvester in picking up and delivering severed spears to a discharge station.

DETAILED DESCRIPTION OF A PREFERRED EMBODIMENT

Figure 1:
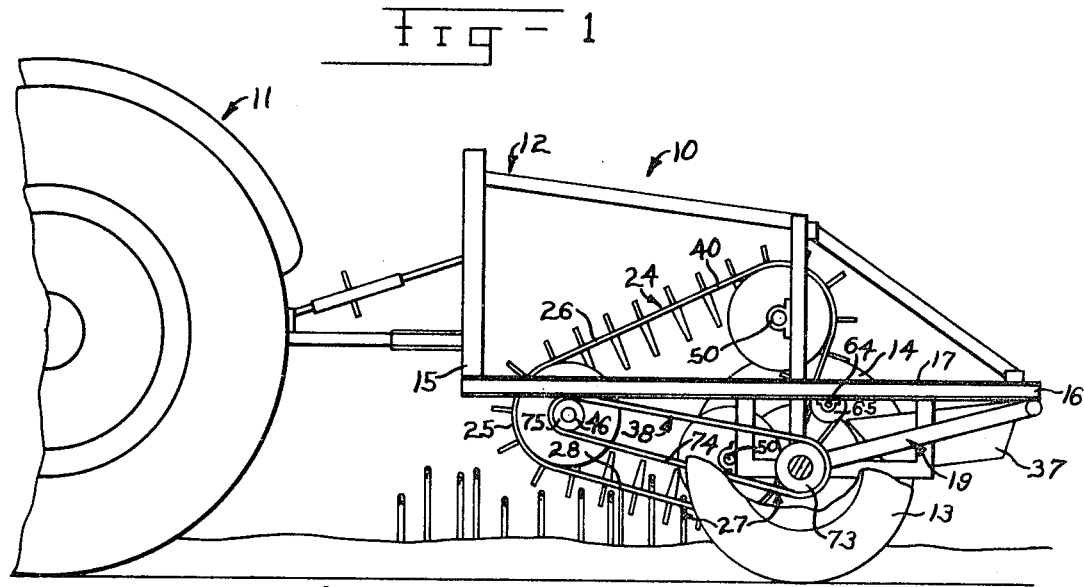
FIG. 1 is a side view of an asparagus harvester embodying the principal features of this invention.
Figure 2:
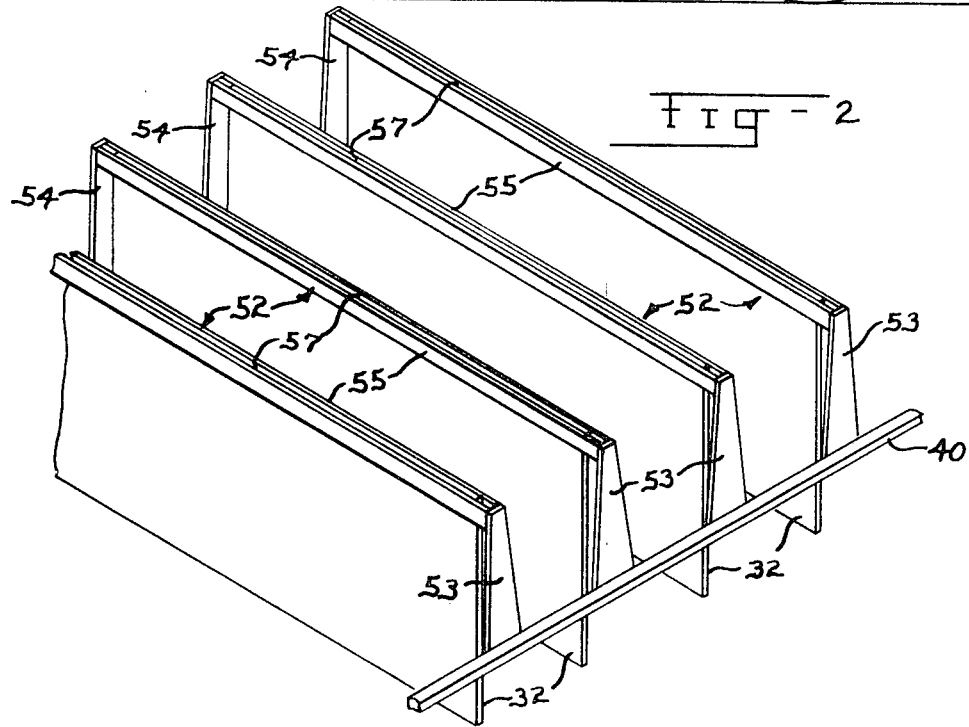
FIG. 2 is a fragmentary perspective view of several of the principal interior elements of the harvester.

An asparagus harvester 10 as shown in side view being pulled over an asparagus field by a prime mover 11 for harvesting mature asparagus spears while leaving the immature spears uncut.

The harvester 10 has a mobile frame 12 supported by wheels 13 and 14. The frame 12 has a front frame member 15, a rear frame member 16, and side frame members 17 and 18. The frame is supported on the wheels through axle assemblies 19 that may be vertically adjusted to raise or lower the frame with respect to the ground.

The harvester 10 has a plurality of cutting elements 20 that depend from the frame for severing the mature spears at or near ground level. For purpose of illustration only, each of the cutting elements have a pair of selective wires 22 that are attached to the front frame member 15 and extend rearward and downward for selecting spears of a certain height and directing the selected spears to cutting blades 23 at the ends of the wire. The blades either ride on the ground or are positioned immediately above ground level intermediate the front frame member 15 and the rear frame member 16. If it is desired to clean cut the field, a single transverse element may be positioned on the frame to take the place of the cutting blades 23.

The harvester has a novel means 24 mounted on the mobile frame for gripping the spears as they are being cut and carrying the cut spears upward for collection. The novel means 24 includes an endless conveyor 25 moveably mounted on the mobile frame having an upper flight 26 and a V-shaped lower flight 27. The lower flight 27 has an inclined front section 28 that extends downward toward the cutting elements to a low point 31 and an inclined rear section 30 that extends upward from the low point and cutting elements.

A plurality of flexible paddles 32 are mounted on the conveyor 25 at longitudinally spaced intervals with free ends 33 extending outward beyond the profile of the conveyor 25 so that the free ends 33 extend downward along the lower flight 27 and below the tops of the asparagus spears at the low point of the conveyor profile. The harvester has a deflecting means 35 mounted on the mobile frame engaging and biasing the free ends 33 against the succeeding adjacent free ends 33 as the paddles 32 move along the low point and the rear section 30 of the lower flight. The biased-together free ends delicately grip both the mature and immature spears as the spears approach the cutting elements. The delicate grip is maintained while the mature spears are being severed. Along the rear section of the flight 27 the biased-together free ends move upward lifting the severed spears from the ground, and slipping from the unsevered spears leaving the unsevered spears undisturbed, rooted in the soil.

The biased-together free ends carry the severed spears along the rear section of the lower flight 27 to a discharge station 36 where the deflecting means becomes ineffective allowing the free ends to assume their normal spaced positions to release the spears, permitting the spears to drop into a receiving and collecting means 37.

The harvester has a drive means 38 operatively connected to the conveyor 25 for moving the lower flight of the conveyor rearward at the same or substantially the same rate as the harvester is being pulled forward so that paddles will appear to be horizontally stationary with respect to the ground along the lower flight. In this manner the paddles will not brush over the spears but will move downward alongside the spears on the front section of the lower flight and upward along the rear section of the lower flight.

In more detail the endless conveyor 25 has a pair of spaced continuous chains 40 and 41 moveably mounted on the mobile frame parallel with the direction of travel of the harvester. Each of the chains are mounted on a front sprocket 42, a lower sprocket 43 and an upper rear sprocket 44, which define the general profile of the flights with the lower sprocket 43 mounted adjacent the cutting elements defining the low point 31 of the lower flight 27. The sprockets 42 and 44 are mounted on corresponding shafts 46 and 48. The shafts 46 and 48 are rotatably supported on the frame by pillow blocks 50. Sprockets 43 are rotatably mounted on stub shafts 47 that project inward from the frame.

The conveyor 25 further comprises a plurality of inverted U-shaped cross frames 52 that are fixed between the two chains at longitudinally evenly spaced intervals for supporting corresponding flexible paddles 32. Each of the cross frames 52 includes radial brackets 53 and 54 that are affixed to the inside of chain links and extend radially inward for a distance slightly less than the radius of the sprockets 42, 43 and 44 so that brackets do not engage the shafts 46, 47 and 48. Each cross frame 52 has a crossbar 55 connected between the brackets 53 and 54.

Each of the paddles 32 have a generally rectangular shape with the major dimension extending substantially the distance between the chains 40 and 41. Each paddle has an upper edge 57 that is affixed to a crossbar 55 with the free end extending outward beyond the periphery of the chains. Preferably the flexible paddles are made of rubber, reinforced fabric or like material that is flexible, yet sufficiently resilient to spring back to a normal position when deflecting forces are removed. As drawn in FIG. 1, belt 68 will rotate in the wrong direction.

The deflecting means 35 comprises a continuous belt 60 supported between a lower roll 61 and an upper roll 62 defining a lower end and an upper end. The rolls 61 and 62 are mounted on shafts 63 and 64 respectively which are in turn rotatably supported by pillow blocks 65. The lower roll is positioned adjacent the low point 31 and the upper roller 62 is positioned adjacent the receiving means to define the discharge station 36. The belt 60 has an upper flight 67 and a lower return flight 68. The upper flight 67 of the belt engages and deflects the free ends of the paddles 32 forward against the succeeding adjacent free ends as the paddles pass by the low point and move along the rear section of the conveyor flight 30 until the paddles pass by the upper roll 62. Thereupon the free ends of the paddles spring back to their normally spaced configuration releasing the severed spears. The spears drop from the upper end of the belt 60 and into the receiving means 37. The belt is made of a flexible cloth material that permits the paddles to delicately, releaseably grip the spears and permit the paddles to slide upward along the unsevered spears without uprooting or damaging the head of such spears.

For purpose of illustration only, the receiving means 37 is shown as a hopper for receiving and collecting the severed spears picked up by the paddles. Alternatively a discharge conveyor could be readily provided to move the spears to the side of the harvester for loading into appropriate containers.

The drive means 38 is driven from one of the wheels through a sprocket 73 affixed to the wheel. A chain 74 extends between the sprocket 73 and a like sprocket 75 mounted on the shaft 46. As previously mentioned, the conveyor 25 is driven at the same speed as the harvester is propelled over the ground.

The drive means 38 also includes a drive connection between the conveyor 25 and the deflecting means 35 to move the deflecting means at the same speed as the conveyor. This is provided by mounting a chain sprocket 77 (FIG. 3) on the roll shaft 64. The chain sprocket 77 engages the chains 40 and 41 to rotate the roll 62. The belt 60 is driven at substantially the same speed as the conveyor 25 so that there will not be any substantial relative motion between the paddles and the engaging upper flight of the belt 60.

It should be understood that the above described embodiment is merely illustrative of the principles of this invention and that numerous other embodiments could readily be devised by persons of ordinary skill in the art without deviating from this invention.

What is claimed is:

1. In a harvester for asparagus and like crops having a mobile frame and cutting means mounted on the frame for severing the base of the spears as the frame is propelled over the ground, wherein the improvement includes a novel means mounted on the frame for gripping the severed spears and carrying the spears to a discharge station comprising:
   a. an endless conveyor movably mounted on the mobile frame with a lower flight having a front section that extends downward toward the cutting elements and a rear section that extends upward from the cutting elements to the discharge station,
   b. a plurality of longitudinally spaced transverse flexible paddles mounted on the conveyor with free ends that extend downward in the lower flight,
   c. drive means operatively connected to the conveyor to move the lower flight of the conveyor rearward at approximately the same speed as the mobile frame is moved forward over the ground, and
   d. deflecting means mounted on the mobile frame adjacent the lower flight deflecting the free ends of the flexible paddles against the forward adjacent paddles as the paddles move rearward along the rear section of the lower flight for gripping severed spears therebetween and carrying the spears upward immediately upon severance along the rear flight section to the discharge station.

2. The harvester as defined in claim 1 wherein the deflecting means includes a continuous belt having a first end adjacent the cutting element and a second end adjacent the discharge station with an upper flight engaging and deflecting the free ends of the paddles between the first and second ends.

3. The harvester as defined in claim 2 wherein the continuous belt is moveably mounted on the frame and wherein the drive means is also operatively connected to the continuous belt to move said upper belt flight in the same direction as the lower flight of the conveyor.

4. The harvester as defined in claim 1 wherein the endless conveyor comprises two transversely spaced endless chains having a plurality of cross frames affixed therebetween at longitudinally spaced intervals and wherein the flexible paddles are affixed to the cross frames with their free ends extending outward.

* * * * *